United States Patent
Hughes et al.

(10) Patent No.: US 9,266,755 B2
(45) Date of Patent: Feb. 23, 2016

(54) TREATMENT STAGES FOR SELENIUM REMOVAL

(71) Applicant: PHILLIPS 66 COMPANY, Houston, TX (US)

(72) Inventors: Mark A. Hughes, Owasso, OK (US); Charles J. Lord, III, Bartlesville, OK (US); Bruce B. Randolph, Bartlesville, OK (US); Joe B. Cross, Bartlesville, OK (US); Sumod Kalakkunnath, Bartlesville, OK (US); Mike K. Corbett, Bartlesville, OK (US); Roger K. Goenner, Billings, MT (US); Larry E. Reed, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 315 days.

(21) Appl. No.: 14/020,388

(22) Filed: Sep. 6, 2013

(65) Prior Publication Data

US 2014/0042065 A1    Feb. 13, 2014

Related U.S. Application Data

(62) Division of application No. 13/035,372, filed on Feb. 25, 2011, now Pat. No. 8,974,676.

(60) Provisional application No. 61/307,916, filed on Feb. 25, 2010.

(51) Int. Cl.
| | |
|---|---|
| *B01D 15/00* | (2006.01) |
| *C02F 1/42* | (2006.01) |
| *C02F 1/58* | (2006.01) |
| *C02F 9/00* | (2006.01) |
| *B01J 20/08* | (2006.01) |

(Continued)

(52) U.S. Cl.
CPC ............. *C02F 1/58* (2013.01); *B01J 20/0262* (2013.01); *B01J 20/08* (2013.01); *B01J 20/103* (2013.01); *B01J 20/20* (2013.01); *B01J 20/3204* (2013.01); *B01J 20/3236* (2013.01); *C02F 1/288* (2013.01); *C02F 9/00* (2013.01); *C02F 1/004* (2013.01); *C02F 1/02* (2013.01); *C02F 1/24* (2013.01); *C02F 1/281* (2013.01); *C02F 1/283* (2013.01); *C02F 1/285* (2013.01); *C02F 1/38* (2013.01); *C02F 1/40* (2013.01); *C02F 1/42* (2013.01); *C02F 1/441* (2013.01); *C02F 1/442* (2013.01); *C02F 1/463* (2013.01); *C02F 1/4693* (2013.01); *C02F 1/5236* (2013.01); *C02F 1/66* (2013.01); *C02F 1/70* (2013.01); *C02F 2001/007* (2013.01); *C02F 2101/101* (2013.01); *C02F 2101/103* (2013.01); *C02F 2101/106* (2013.01); *C02F 2101/20* (2013.01); *C02F 2101/32* (2013.01); *C02F 2101/325* (2013.01); *C02F 2103/001* (2013.01); *C02F 2103/10* (2013.01); *C02F 2103/365* (2013.01); *C02F 2301/08* (2013.01)

(58) Field of Classification Search
CPC .............. C02F 1/004; C02F 1/02; C02F 1/24; C02F 1/281; C02F 1/283; C02F 1/285; C02F 1/288; C02F 1/38; C02F 1/40; C02F 1/42; C02F 1/441; C02F 1/442; C02F 1/463; C02F 1/4693; C02F 1/5236
USPC .................. 210/638, 679, 665, 664, 669, 259
See application file for complete search history.

*Primary Examiner* — Dirk Bass
(74) *Attorney, Agent, or Firm* — Phillips 66 Company

(57) ABSTRACT

Methods and apparatus relate to treating fluid to at least reduce selenium content within the fluid. The treating includes conditioning stages to alter a composition of the fluid prior to removal of the selenium content from the fluid. The composition of the fluid after the conditioning stages facilitates the removal of the selenium content or at least limits detrimental impact to selenium removal efficiency.

6 Claims, 8 Drawing Sheets

(51) Int. Cl.
  *B01J 20/20* (2006.01)
  *B01J 20/32* (2006.01)
  *B01J 20/02* (2006.01)
  *B01J 20/10* (2006.01)
  *C02F 1/02* (2006.01)
  *C02F 1/24* (2006.01)
  *C02F 1/28* (2006.01)
  *C02F 1/38* (2006.01)
  *C02F 1/44* (2006.01)
  *C02F 1/463* (2006.01)
  *C02F 1/52* (2006.01)
  *C02F 101/10* (2006.01)
  *C02F 101/20* (2006.01)
  *C02F 101/32* (2006.01)
  *C02F 1/00* (2006.01)
  *C02F 1/40* (2006.01)
  *C02F 1/469* (2006.01)
  *C02F 1/66* (2006.01)
  *C02F 1/70* (2006.01)
  *C02F 103/00* (2006.01)
  *C02F 103/10* (2006.01)
  *C02F 103/36* (2006.01)

TREATMENT STAGES FOR SELENIUM REMOVAL

CROSS-REFERENCE TO RELATED APPLICATIONS

This application is a divisional application of application Ser. No. 13/035,372, filed Feb. 25, 2011, which claims benefit under 35 USC §119(e) to U.S. Provisional Application Ser. No. 61/307,916 filed Feb. 25, 2010, entitled "TREATMENT STAGES FOR SELENIUM REMOVAL".

STATEMENT REGARDING FEDERALLY SPONSORED RESEARCH OR DEVELOPMENT

None

FIELD OF THE INVENTION

Embodiments of the invention relate to methods and systems for staged treating of fluid to remove selenium from the fluid.

BACKGROUND OF THE INVENTION

Fossil fuels contain naturally occurring selenium, which exists in several oxidation states, including selenide (−2), elemental selenium (0), selenite (+4), and selenate (+6). Refining of oils and processing of coals containing selenium can generate process water with amounts of selenium-containing compounds in excess of limits allowed by governmental standards for discharge of the water into the environment. These aqueous streams often include the selenium in soluble forms, such as selenocyanate ($SeCN^-$) in zero oxidative states and selenite ($SeO_3^{-2}$) and selenate ($SeO_4^{-2}$) as oxidized species.

Various treatment techniques for the process water provide ways to remove selenium and may rely on adsorption. The techniques often remove all types of the selenium to some extent but with relative less ability to remove the oxidized species of the selenium. Past improvements to selenium removal effectiveness and efficiency focus on materials for sorbents and sorption reaction conditions between the sorbents and the selenium. However, the treatment techniques still may not enable achieving selenium limits at all times and with a sufficient margin from desired or regulated levels. Cleaned water resulting from the treatment techniques further often fails to meet criteria for reuse of the cleaned water in such applications as feed to boilers or desalting units.

Therefore, a need, exists for improved methods and systems for removal of selenium from a fluid.

SUMMARY OF THE INVENTION

In one embodiment, a method of treating an aqueous stream includes removing a selenium sorption inhibitor from the aqueous stream. The step of removing the selenium sorption inhibitor includes reducing in concentration at least one of oils, soluble organic compounds, and thiosulfate from the aqueous stream. Next, the method includes removing selenium from the aqueous stream by passing the aqueous stream from which the concentration of the sorption inhibitor has been reduced into contact with a support impregnated with at least one of sulfur, selenium and tellurium to absorb the selenium and provide treated water as effluent.

According to one embodiment, a system for treating an aqueous stream includes a conditioning unit having at least one of an oil removal component, a soluble organics removal component, and a thiosulfate removal component coupled to receive the aqueous stream for treatment thereof. The system further includes a selenium removal unit having a treated water output and an input coupled to receive an outflow of the aqueous stream from the conditioning unit. The outflow is in fluid communication with a support impregnated with at least one of sulfur, selenium and tellurium to absorb selenium in the outflow within a flow path between the input and the treated water output.

For one embodiment, a method of treating an aqueous stream includes removing selenium from an aqueous stream by passing the aqueous stream through a sorbent bed and into contact with a support impregnated with at least one of sulfur, selenium and tellurium to absorb the selenium. Adding a reducing agent to the aqueous stream removed from the sorbent bed and containing some of the selenium in a positive oxidation state causes the selenium to form a precipitate. The method further includes removing the precipitate from the aqueous stream.

BRIEF DESCRIPTION OF THE DRAWINGS

The invention, together with further advantages thereof, may best be understood by reference to the following description taken in conjunction with the accompanying drawings.

DETAILED DESCRIPTION OF THE INVENTION

Embodiments of the invention relate to treating fluid to at least reduce selenium content within the fluid, which may be an aqueous liquid from a petroleum refinery, a power plant, irrigation runoff, mine tailings, solid fuel gasification or industrial waste, for example. As used herein, "selenium" refers to selenium within or from compounds, such as selenocyanate, selenite, selenate, hydrogen selenide, organo-selenium compounds, and combinations thereof, containing selenium and at least one other element and/or elemental selenium. Concentration of the selenium thus provides the selenium content within the fluid. The treating includes conditioning stages to alter a composition of the fluid prior to removal of the selenium content from the fluid. The composition of the fluid after the conditioning stages facilitates the removal of the selenium content or at least limits detrimental impact to selenium removal efficiency.

Figure 1:
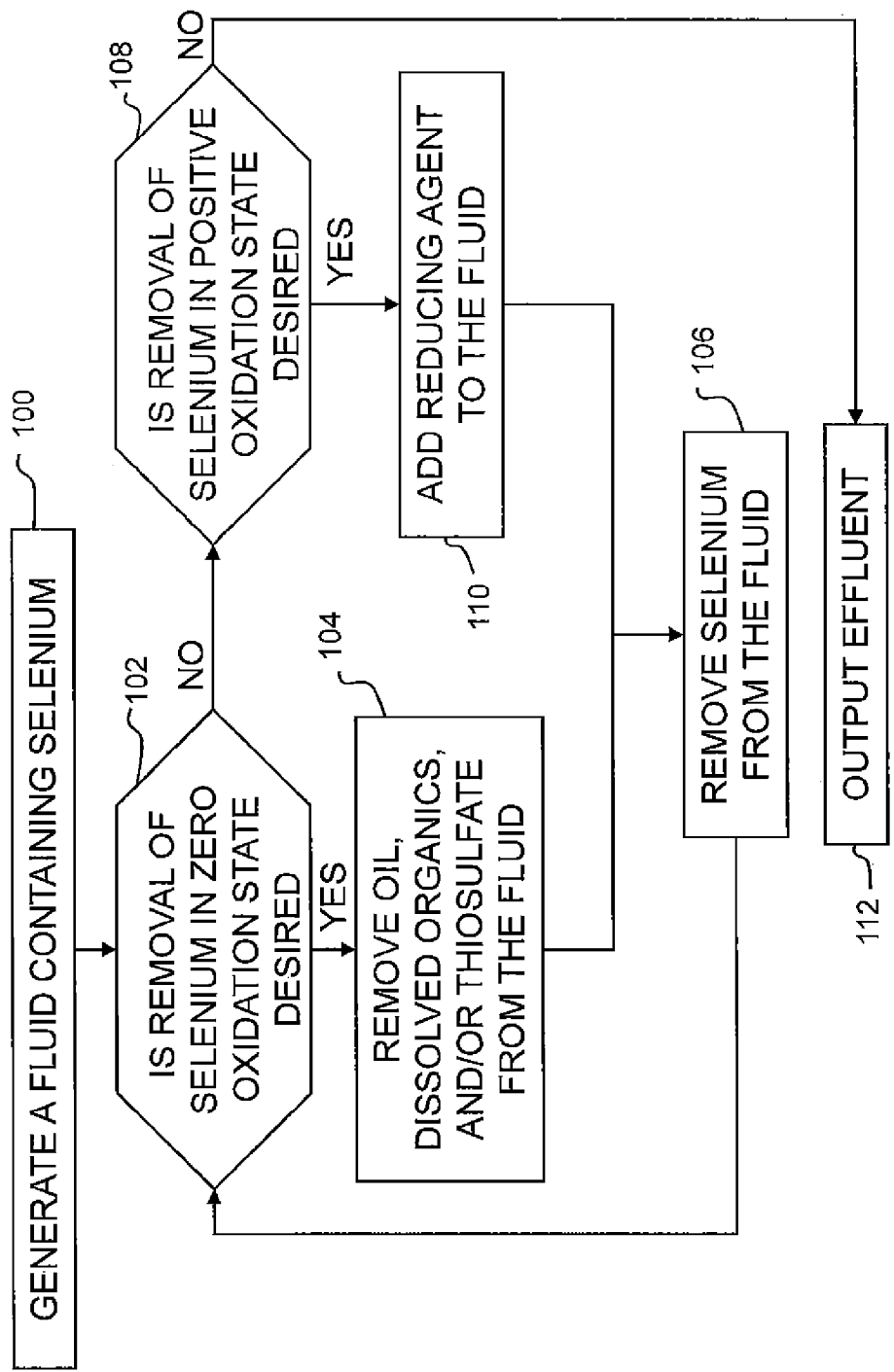
FIG. 1 is a flow chart for a selenium removal process, according to one embodiment of the invention.

FIG. 1 shows a flow chart for one embodiment of a selenium removal process. A stream of fluid produced in a supply step 100 contains selenium. Some applications such as described further herein proceed given a first treatment path selection 102 to an inhibitor removal step 104. Desire to remove selenium in a zero oxidation state, such as selenocyanate, from the fluid provides one criteria for the first treatment path selection 102. The inhibitor removal step 104 includes removing oils, dissolved organics and/or thiosulfate from the fluid. As demonstrated herein by FIGS. 8-11, the oils, the dissolved organics and the thiosulfate tend to inhibit removing of the selenium from the fluid in a subsequent selenium removal step 106. The process may proceed, if no further treatment for selenium is desired, to an output step 112 providing effluent produced in the selenium removal step 106.

In some embodiments, the process proceeds given a second treatment path selection 108 to a precipitation step 110 where a reducing agent is added to the fluid, which may come straight from the supply step 100 or may have some selenium already removed after the inhibitor removal step 104. Since the reducing agent causes selenite to precipitate, desire to remove selenium in a positive oxidation state from the fluid provides one criteria for the second treatment path selection 108. The selenium removal step 106 used following the precipitation step 110 separates solids from liquids in the fluid and thus may utilize removal techniques that are alike or different from those used following the inhibitor removal step 104. If no further treatment for selenium is desired, the process may proceed at this point in the process to the output step 112 providing the effluent.

Figure 2:
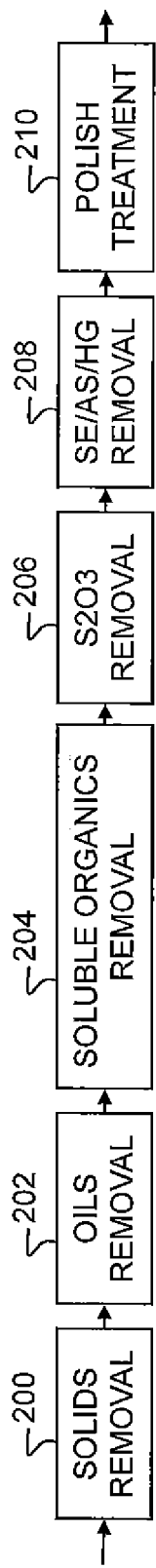
FIG. 2 is a system flow diagram of functional fluid treatments utilizable in various combinations to form all or part of the selenium removal process, according to one embodiment of the invention.

FIG. 2 illustrates a system flow diagram of functional fluid treatments utilizable in various combinations and orders to form all or part of the selenium removal process to treat a fluid. The treatments utilize any of a solids removal unit 200, an oils removal unit 202, a soluble organics removal unit 204 and a thiosulfate ($S_2O_3^{-2}$) removal unit 206 in combination with a selenium removal unit 208. The selenium removal unit 208 thus receives the fluid after having passed through at least one of the solids removal unit 200, the oils removal unit 202, the soluble organics removal unit 204 and the thiosulfate removal unit 206. One or more of the solids removal unit 200, the oils removal unit 202, the soluble organics removal unit 204 and the thiosulfate removal unit 206 may be combined in some embodiments such that one device achieves two or more of the functional fluid treatments. For some embodiments, the treatments may further implement a polish treatment unit 210 downstream of the selenium removal unit 208 for removing any residual constituents that might otherwise prevent recycling of the fluid.

The solids removal unit 200 at least reduces concentration of solid particulate in the fluid. Exemplary methods employed by the solids removal unit 200 for reducing the concentration of the solid particulate include size exclusion based cartridge filtration, settling, centrifugation, dissolved gas floatation, electro-coagulation, and ceramic membrane filtration. The solid particulate remaining in the fluid if allowed to enter a sorbent bed forming the selenium removal unit 208 tends to plug the sorbent bed. This plugging results in elevating a differential pressure across the sorbent bed above practical operation levels. Further, the solids removal unit 200 may limit fouling of the selenium removal unit 208 from oils coated on the solid particulate that is removed from the fluid prior to the fluid being introduced to the selenium removal unit 208.

Inflow of the fluid into the solids removal unit 200 may contain the solid particulate in a concentration range of 1 parts per million (ppm) to 10,000 ppm, 10 ppm to 1000 ppm, or about 500 ppm. The solid particulate may range in diameter from 1 to 10,000 micrometers or 20 to 2000 micrometers. Reduction in the particulate quantity within the fluid with the solids removal unit 200 may result in the fluid having less than 50 ppm or less than 10 ppm of the particulate.

The oils removal unit 202 at least reduces concentration of free and emulsified oil in the fluid. Exemplary methods employed by the oils removal unit 202 for reducing the concentration of the oil include flotation, settling, electro-coagulation, ceramic membrane filtration, organo-clay bed and solvent extraction. Since many of the exemplary methods for the oils removal unit 202 and the solids removal unit 200 are alike, a single device may define the oils removal unit 202 and the solids removal unit 200 capable of achieving desired removal of both the oils and the particulate. The oil remaining in the fluid if allowed to enter the sorbent bed forming the selenium removal unit 208 tends to coat sorbent material forming the sorbent bed rendering the sorbent material inactive.

Initial quantity of the oil in the fluid can range from 1 ppm to 10,000 ppm or be greater than 100 ppm or greater than 10 ppm. Temporary refinery upsets may cause the quantity of the oil in the fluid to spike to as high as 99.9% of the fluid. Reduction in the oil within the fluid with the oils removal unit 202 may result in the fluid having less than 100 ppm or less than 10 ppm of the oil.

The soluble organics removal unit 204 at least reduces concentration of organic soluble compounds in the fluid. The compounds may include organic acids or phenolic compounds, such as those having a formula defined by $C_xH_y(COOH)_n$ or $C_xH_y(OH)_n$, where x, y, and n are greater than 0, including naphthenic acid, formic acid, acetic acid, propionic acid, butyric acid, phenol and cresol and their derivatives. Exemplary methods employed by the soluble organics removal unit 204 for reducing the concentration of the organic soluble compounds include solvent extraction, precipitation, nanofiltration, ion exchange, activated carbon bed, organo-clay bed and distillation. In some embodiments, spent sorbent material that no longer provides sufficient selenium sorption and that is taken from the selenium removal unit 208 protected from the organic soluble compounds forms the activated carbon bed used in the soluble organics removal unit 204. Again, removal of the soluble organics may be accomplished in tandem with removal of the solids and/or the oils using the methods suitable for such removal.

Initial concentration of the organic acids dissolved in the fluid may range between 1 ppm and 10,000 ppm or between 10 ppm and 2000 ppm. The fluid may also contain an initial concentration between 1 ppm and 10,000 ppm or between 100 ppm and 1000 ppm of the phenolic compounds dissolved in the fluid. Reduction in the soluble organics concentration within the fluid with the soluble organics removal unit 204 may result in the fluid having less than 10 ppm of the soluble organics.

The thiosulfate removal unit 206 at least reduces concentration of dissolved thiosulfate in the fluid. Nanofiltration provides one exemplary method employed by the thiosulfate removal unit 206. In some embodiments, the nanofiltration uses a membrane that has a maximum pore size below 100 nanometers. The membrane used for the nanofiltration rejects divalent anions, such as thiosulfate, and passes monovalent anions, such as selenocyanate.

Solids, oils and/or organic compounds treatment ahead of such nanofiltration membrane prevents the nanofiltration membrane from being overloaded. The nanofiltration membrane may further reduce organic compounds dissolved in the fluid having a relative lower molecular weight than the organic compounds removed by such methods as organo-clay sorbents. For some embodiments, removal of only relative higher molecular weight organic compounds without use of the nanofiltration membrane may be sufficient since the relative higher molecular weight organic compounds result in more negative influence on the selenium removal unit 208 than the organic compounds with the relative lower molecular weight.

Initial concentration of the thiosulfate dissolved in the fluid may range between 1 ppm and 1000 ppm, between 10 ppm and 100 ppm or about 40 ppm. Reduction in the thiosulfate concentration within the fluid with the thiosulfate removal unit 206 may result in the fluid having less than 1 ppm or less than 0.1 ppm of the thiosulfate. A reject stream separated from the fluid by the thiosulfate removal unit 206 may mix with effluent output from the selenium removal unit 208, be discharged as waste, or undergo further wastewater treatment.

The selenium removal unit 208 at least reduces concentration of the selenium in the fluid. The sorbent material used in the selenium removal unit 208 for sorption of the selenium includes a substrate or support that may be a porous material and is associated with at least one of tellurium, selenium and sulfur. Examples of the support include activated or porous carbon alumina and/or silica. For example, a sulfur impregnated activated carbon may define the sorbent material within the selenium removal unit 208. Percentage of sulfur loading of the support ranges in some embodiments from 1.0% to 40.0% by weight or from about 10.0% to about 30.0% by weight. In some embodiments, methods of making the sorbent material may involve heating the support in presence of a sulfur, selenium or tellurium compound, heating the support in presence of elemental forms of sulfur, selenium or tellurium, wetting the support with a solution containing a sulfur, selenium or tellurium compound, or reacting a sulfur, selenium, or tellurium compound in presence of the substrate, such as a Claus condensation reaction. For some embodiments, solid catalyst or sorbent that is taken upon becoming spent from another process in which sulfur, selenium, or tellurium is involved provides the sorbent material still useful in the selenium removal unit 208 for sorption of the selenium.

The sorbent material displays affinity for selenium removal from the fluid. A flow path for the fluid contacts the sorbent material that is packed within the selenium removal unit 208. The sorbent material adsorbs the selenium within the fluid such that effluent from the selenium removal unit 208 provides the fluid treated to be suitable for discharge into the environment or optional reuse.

In some embodiments, adjusting the pH of the fluid to between 1.0 and 10.0, between 2.0 and 7.0 or between 2.5 and 5.0 facilitates adsorption. Adding to the fluid an acid selected from, for example, at least one of sulfuric acid ($H_2SO_4$), tin(II) chloride ($SnCl_2$), iron(II) chloride ($FeCl_2$), aluminum chloride ($AlCl_3$), nitric acid ($HNO_3$) and hydrochloric acid (HCl) prior to contacting the fluid with the sorbent material can lower pH of the fluid that has an initial pH more basic than desired. Further, heating the fluid and/or the sorbent bed to between 1° C. and 100° C., between 60° C. and 90° C. or about 75° C. may aid in the adsorption. Injection of steam into the fluid and/or heat exchange with the fluid may raise a temperature of the fluid. Hydraulic flux of the fluid through the selenium removal unit 208 may vary from 0.1 to 20 gallons per minute per foot squared ($GPM/ft^2$), 1 to 6 $GPM/ft^2$ or from 2 to 3 $GPM/ft^2$.

On an elemental selenium basis, the fluid may contain at least 0.01 ppm or at least 1.0 ppm of the selenium. For some embodiments, the fluid contacts a sufficient quantity of the sorbent material such that the fluid contains at least 40% by weight less of the selenium content than in the fluid entering the selenium removal unit 208. The fluid may further contain an initial concentration of arsenic compounds, such as arsenite, arsenate, organo arsenic compounds and arsine, in a range of 0.01 ppm to 10,000 ppm, 0.1 ppm to 4 ppm or 0.1 ppm to 1 ppm. In addition, the fluid may contain an initial concentration of mercury compounds, such as elemental mercury, organo mercury compounds and oxidized mercury compounds (e.g., compounds containing dissolved mercury cations and/or mercuric chloride) in a range of 1 part per trillion (ppt) to 1 ppm or 10 ppt to 0.1 ppm. In some embodiments, the sorbent material in the selenium removal unit 208 also sorbs such arsenic and mercury compounds from the fluid.

The polish treatment unit 210 at least reduces concentration of residual components in the fluid. The fluid that exits the polish treatment unit 210 or the selenium removal unit 208 may supply a process or application by, for example, being reused as oil refinery cooling tower water, water input into a boiler, desalter water or condensate water. The treatments enable removing the selenium without addition of chemicals such as copper or iron that would present problems with reusing the fluid. Exemplary methods employed by the polish treatment unit 210 include physical processes such as reverse osmosis, electrodialysis, and/or thermal methods to reject other constituents that may be undesired for further reuse.

Figure 3:
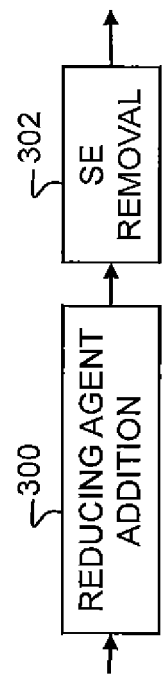
FIG. 3 is a system flow diagram of alternative functional fluid treatments that may also form all or part of the selenium removal process, according to one embodiment of the invention.

FIG. 3 shows a system flow diagram of alternative functional fluid treatments that may also form all or part of the selenium removal process. The treatments utilize a reducing agent injector 300 for adding a reducing agent to the fluid ahead of passing the fluid through a selenium precipitate remover 302. On an elemental selenium basis, the fluid may contain between 5 ppb and 1000 ppm or between 5 ppb and 2000 ppb of selenite prior to treatment with the reducing agent injector 300 and the selenium precipitate remover 302. In some embodiments, the reducing agent injector 300 and the selenium precipitate remover 302 couple to receive the fluid from the selenium removal unit 208 shown in FIG. 2.

Examples of the reducing agent include compounds capable of generating sulfite in solution. Such compounds include thiosulfate, bisulfite and sulfur dioxide. The reducing agent injector 300 adds enough sulfite to the fluid to create a molar excess relative to selenite concentration in the fluid. The molar excess may range from 1 to 100 or 10 to 20 times the selenite concentration. By way of example, the reducing agent injector may introduce gaseous sulfur dioxide into the fluid or add a solution of sodium thiosulfate to the fluid. The reducing agent converts selenite to insoluble elemental selenium forming precipitate in the fluid.

In some embodiments, adjusting the pH and/or temperature as discussed with respect to the selenium removal unit 208 in FIG. 2 facilitates selenium removal with the selenium precipitate remover 302. The selenium precipitate remover 302 may include sorbent material and operate and be analogous to the selenium removal unit 208 described herein. Other options for the selenium precipitate remover 302 include any filtering device, a settling tank and/or a bed filled with solid particles, such as silica, alumina or activated carbon, without impregnation thereof with sulfur, selenium, or tellurium.

Figure 4:
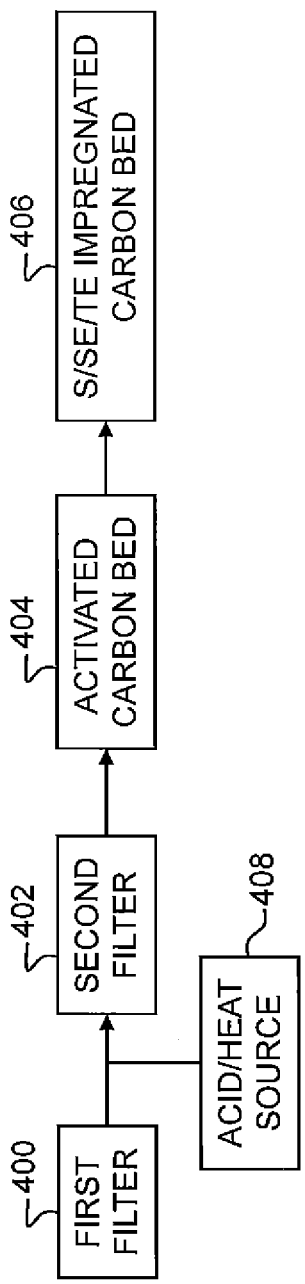
FIG. 4 is a block diagram for a first exemplary implementation of the selenium removal process, according to one embodiment of the invention.

FIG. 4 illustrates a block diagram for a first exemplary implementation of the selenium removal process. This implementation may be chosen in some embodiments for processing moderate levels of solids (about 500 ppm) and relative low level of oils (>50 ppm) with treatment for dissolved organics (>400 ppm) and without treatment for thiosulfate. A first solids filter 400 and a second solids filter 402 sandwich a pH and temperature adjuster 408. The filters 400, 402 exclude or prevent passage of particles above a certain threshold size. The pH adjustment between the first solids filter 400 and the second solids filter 402 enables removing precipitated materials, such as organic compounds that are dissolved in the fluid until the pH of the fluid drops. After the solids are removed, the fluid passes through a granular activated carbon bed 404 to reduce concentration of organic compounds that remain dissolved. The fluid then passes through two sulfur impregnated activated carbon beds 406 for removal of the selenium.

Figure 5:
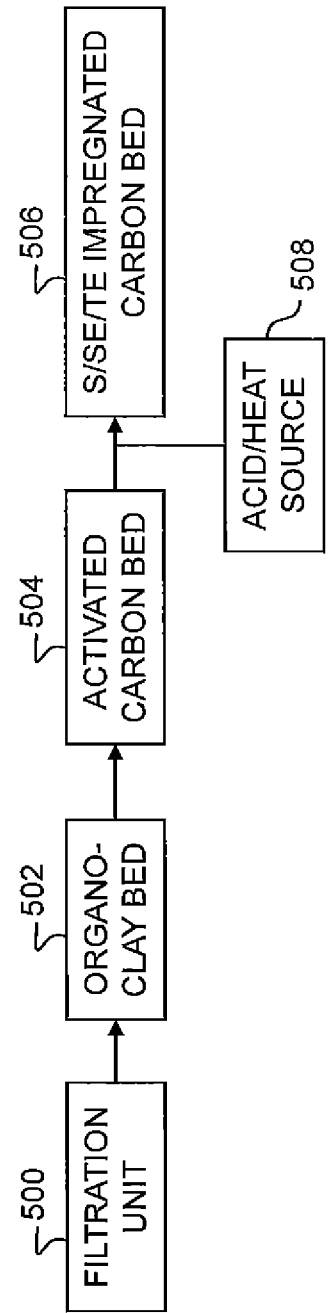
FIG. 5 is a block diagram for a second exemplary implementation of the selenium removal process, according to one embodiment of the invention.

FIG. 5 shows a block diagram for a second exemplary implementation of the selenium removal process. Such implementation may be chosen for processing relative low levels of solids (<200 ppm) with treatment for oils (>100 ppm) and dissolved organics (>400 ppm) without treatment for thiosulfate. The implementation includes a filtration cartridge 500 to remove solid particulate from the fluid. Outflow from the filtration cartridge 500 enters an oil sorbent bed 502 packed with organo-clay to remove the oil from the fluid. While the organo-clay in the oil sorbent bed 502 sorbs free and emulsified oil, the filtration cartridge 500 may also reduce oil content in the fluid by removal of oil coated solids, which are not as effectively removed by the oil sorbent bed 502. Once the solids and oils are removed from the fluid, the fluid passes to an activated carbon bed 504 that sorbs the dissolved organics in the fluid. A pH and temperature adjuster 508 brings the fluid to a desired temperature and pH at any point ahead of the fluid being introduced into a selenium sorbent bed 506 for removal of the selenium.

Figure 6:
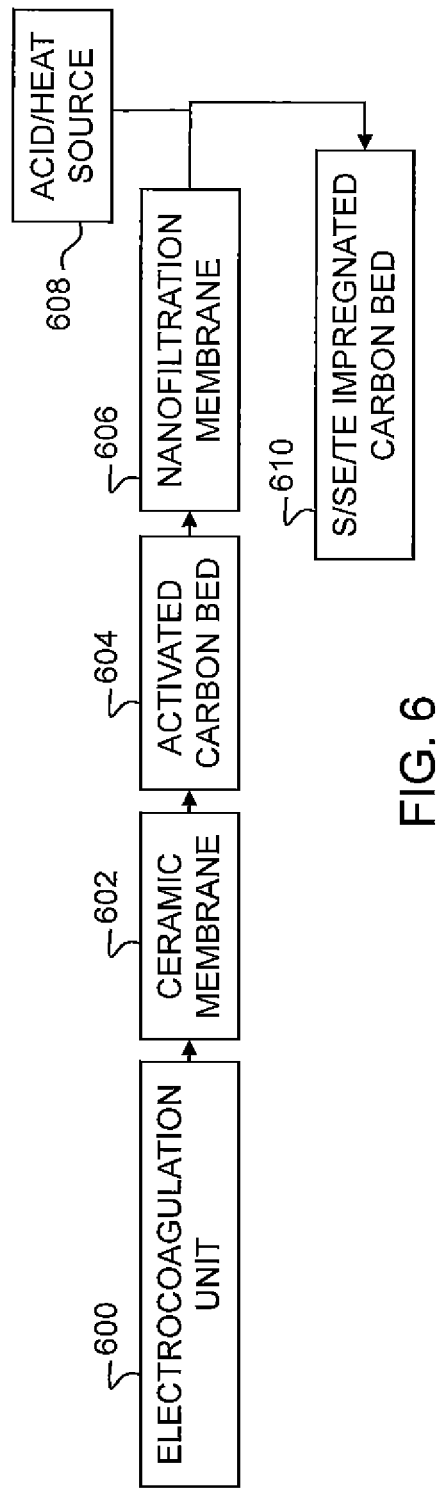
FIG. 6 is a block diagram for a third exemplary implementation of the selenium removal process, according to one embodiment of the invention.

FIG. 6 illustrates a block diagram for a third exemplary implementation of the selenium removal process. Some embodiments with this implementation provide processing for relative high levels of solids (>500 ppm) with treatment for oils (>100 ppm), dissolved organics (>400 ppm) and thiosulfate (>10 ppm). The implementation includes an electro-coagulation unit 600 and ceramic membrane 602 used to remove oils and/or solid particulate from the fluid. Outflow from the ceramic membrane 602 passes to an activated carbon bed 604 that sorbs the dissolved organics in the fluid. A nanofiltration membrane 606 disposed between the activated carbon bed 604 and a selenium sorbent bed 610 removes thiosulfate from the fluid. A pH and temperature adjuster 608 brings the fluid to a desired temperature and pH at any point ahead of the fluid being introduced into a selenium sorbent bed 610 for removal of the selenium.

Figure 7:
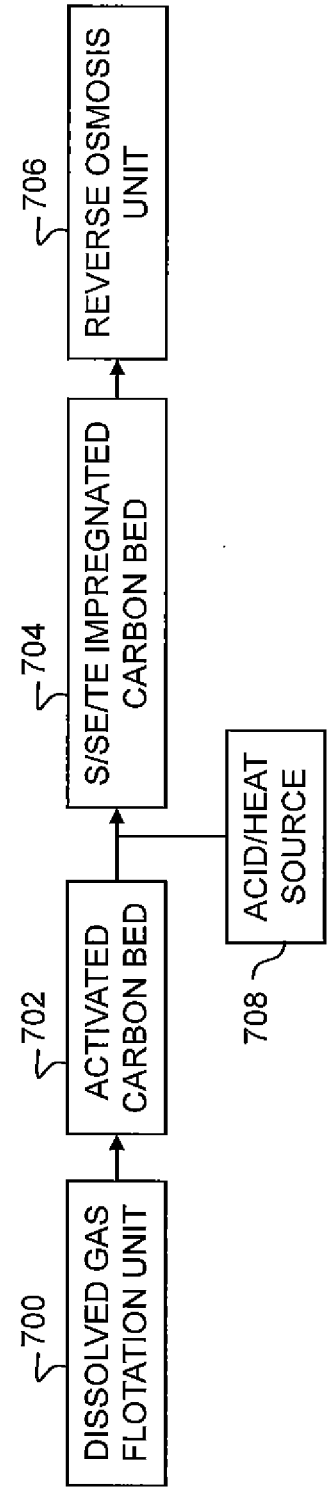
FIG. 7 is a block diagram for a fourth exemplary implementation of the selenium removal process, according to one embodiment of the invention.

FIG. 7 shows a block diagram for a fourth exemplary implementation of the selenium removal process. Embodiments with this implementation may provide processing for moderate levels of solids (about 500 ppm) and oils (50 ppm to 100 ppm) and for relative low levels of dissolved organics (<500 ppm) with no treatment for thiosulfate. A dissolved gas flotation unit 700 lifts particles and/or oil to a top of a tank for skimming off the particles and/or oil and may introduce an agent to help float the oil such that the particles and/or oil are removed from the fluid. Outflow from the flotation unit 700 passes to an activated carbon bed 702 that sorbs the dissolved organics in the fluid prior to selenium removal with a selenium sorbent bed 704. A pH and temperature adjuster 708 brings the fluid to a temperature and pH based on desired operating parameters of the selenium sorbent bed 704. A reverse osmosis unit 706 may remove remaining impurities in the fluid following use of the selenium sorbent bed. Such further treatment following the selenium sorbent bed 704 while shown in FIG. 7 may be applied to any other exemplary embodiments described herein.

Figure 8:
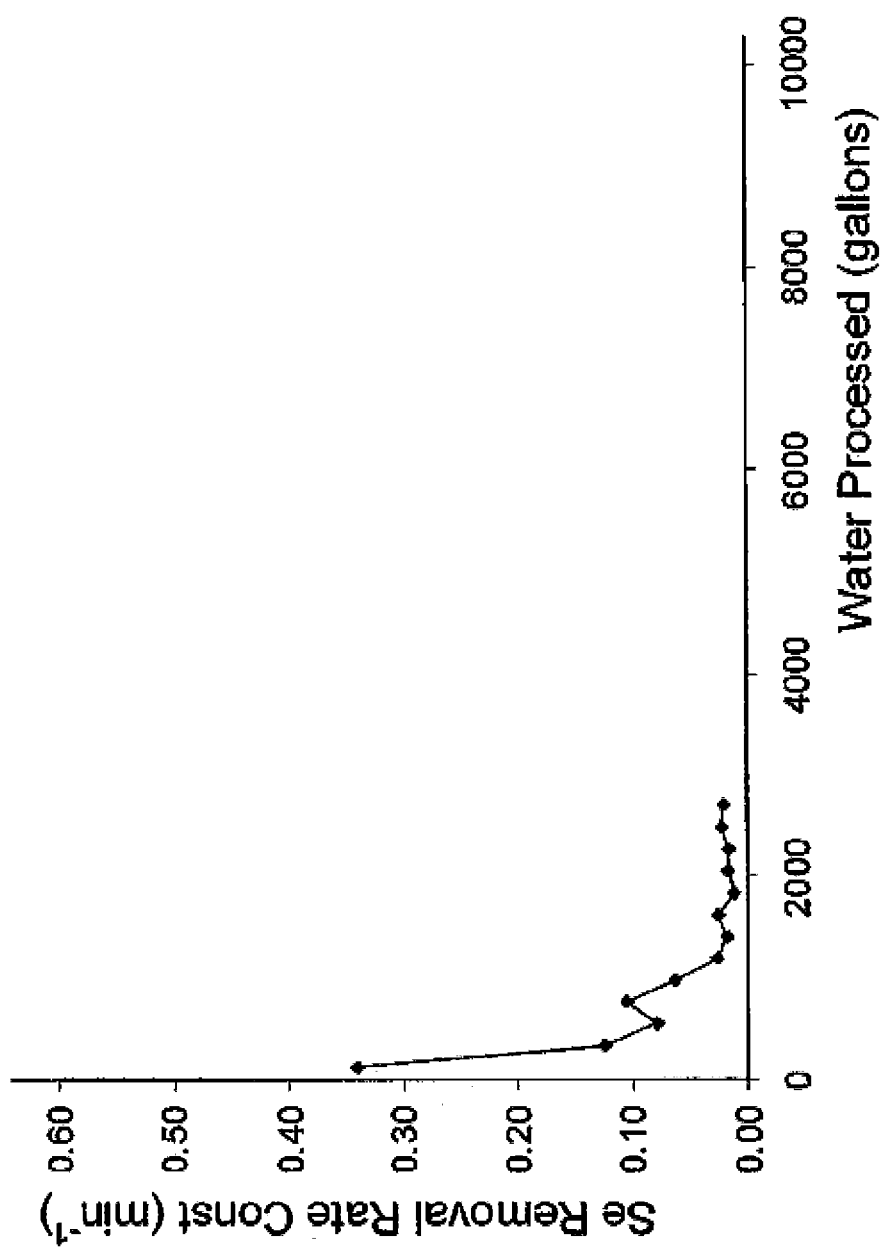
FIG. 8 is a plot of a first order rate constant for selenium removal versus water processed showing negative impact by oils on selenium sorption performance.

FIG. 8 illustrates a plot of a first order rate constant for selenium removal versus water processed showing negative impact by oils on selenium sorption performance. A selenium sorbent bed was used to remove selenium from a petroleum refinery stripped sour water after only having had solid particulate matter removed from the water by using a 10 micron filter before acidification of the water. The stripped sour water experienced upsets of elevated oil in water events and thus still contained oil upon being passed through the selenium sorbent bed. The selenium sorbent bed fouled after treating only 1200 gallons of the water.

Figure 9:
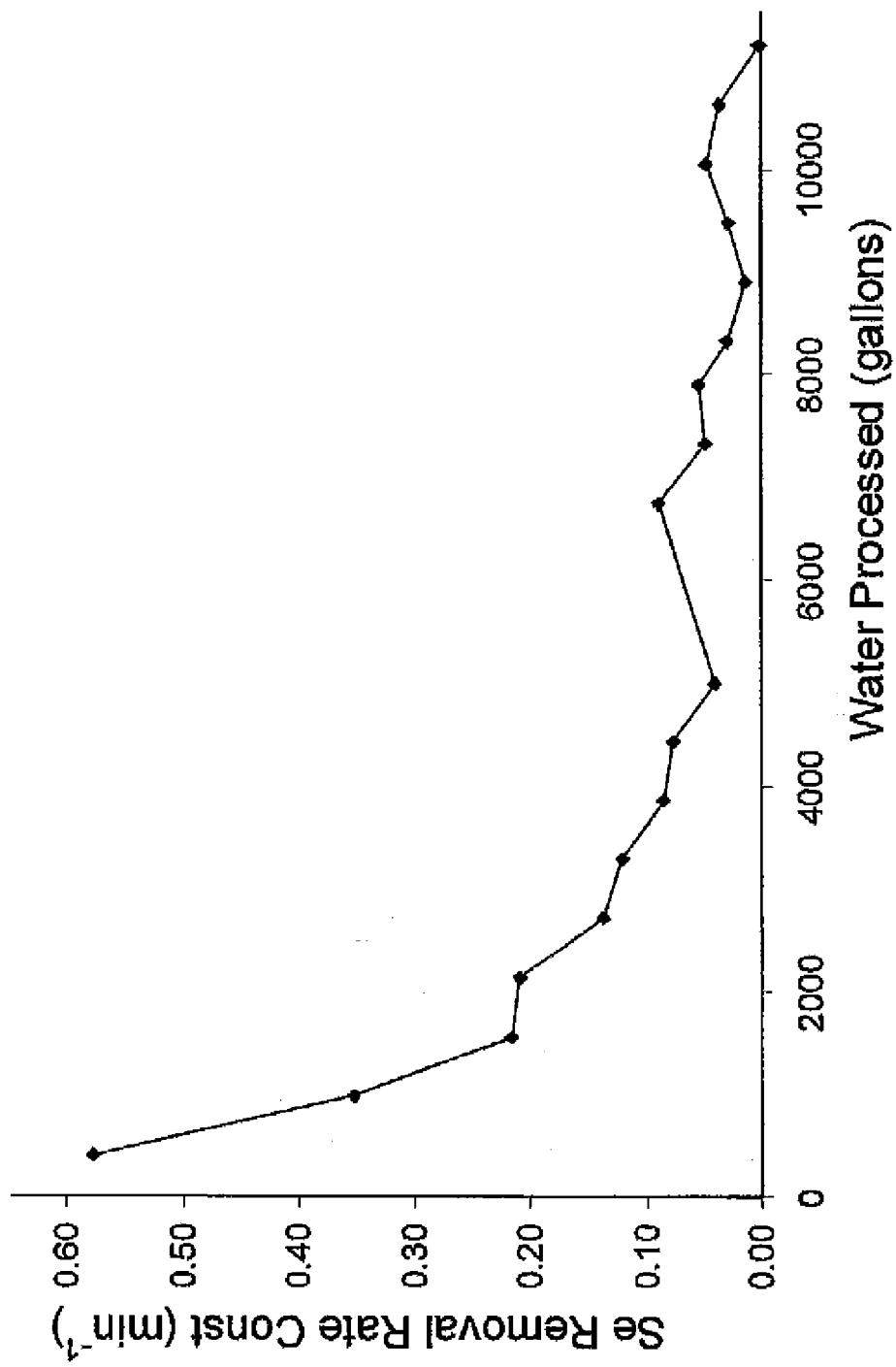
FIG. 9 is a plot of a first order rate constant for selenium removal versus water processed illustrating relative to FIG. 8 sorbent life extended by removal of soluble organics before contact of the water with sorbent for absorption of selenium even though the oils still influence the selenium sorption performance.

FIG. 9 shows a plot of a first order rate constant for selenium removal versus water processed illustrating relative to FIG. 8 sorbent life extended by removal of soluble organics before contact of the water with sorbent for absorption of selenium even though the oils still influence the selenium sorption performance. A selenium sorbent bed was used to remove selenium from a petroleum refinery stripped sour water after having had both solid particulate matter and soluble organics removed from the water. The particulate matter was removed by using a 10 micron filter before acidification of the water. The soluble organics were removed by passing the water through an activated carbon bed after acidification of the water. The selenium sorbent bed fouled at least in part due to oils remaining in the water after treating more than 11000 gallons of the water.

Figure 10:
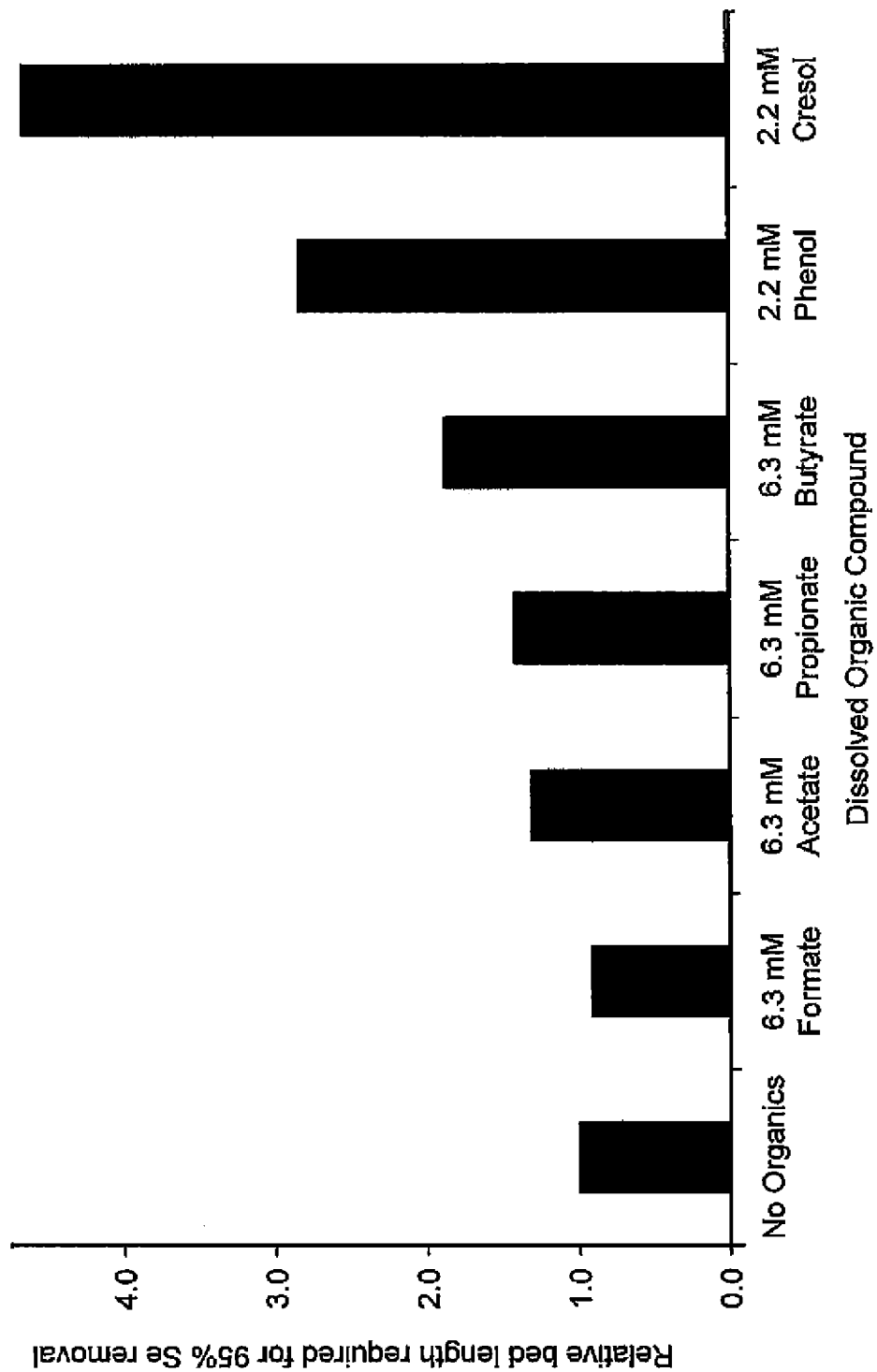
FIG. 10 is a bar graph of comparative undesirable increases in sorbent bed lengths required to obtain a 95% selenium removal threshold when the water contains various dissolved organic compounds.

FIG. 10 illustrates a bar graph of comparative undesirable increases in selenium sorbent bed lengths required to obtain a 95% selenium removal threshold when the water contains various dissolved organic compounds. Given a relative bed length of 1 for treating the water without soluble organics, concentrations of 6.3 millimolar acetate, propionate or butyrate, 2.2 millimolar phenol or 2.2 millimolar cresol require the relative bed lengths greater than 1 to achieve the 95% selenium removal threshold. For example, the relative bed length is greater than 4 if the water contains the 2.2 millimolar cresol.

Figure 11:
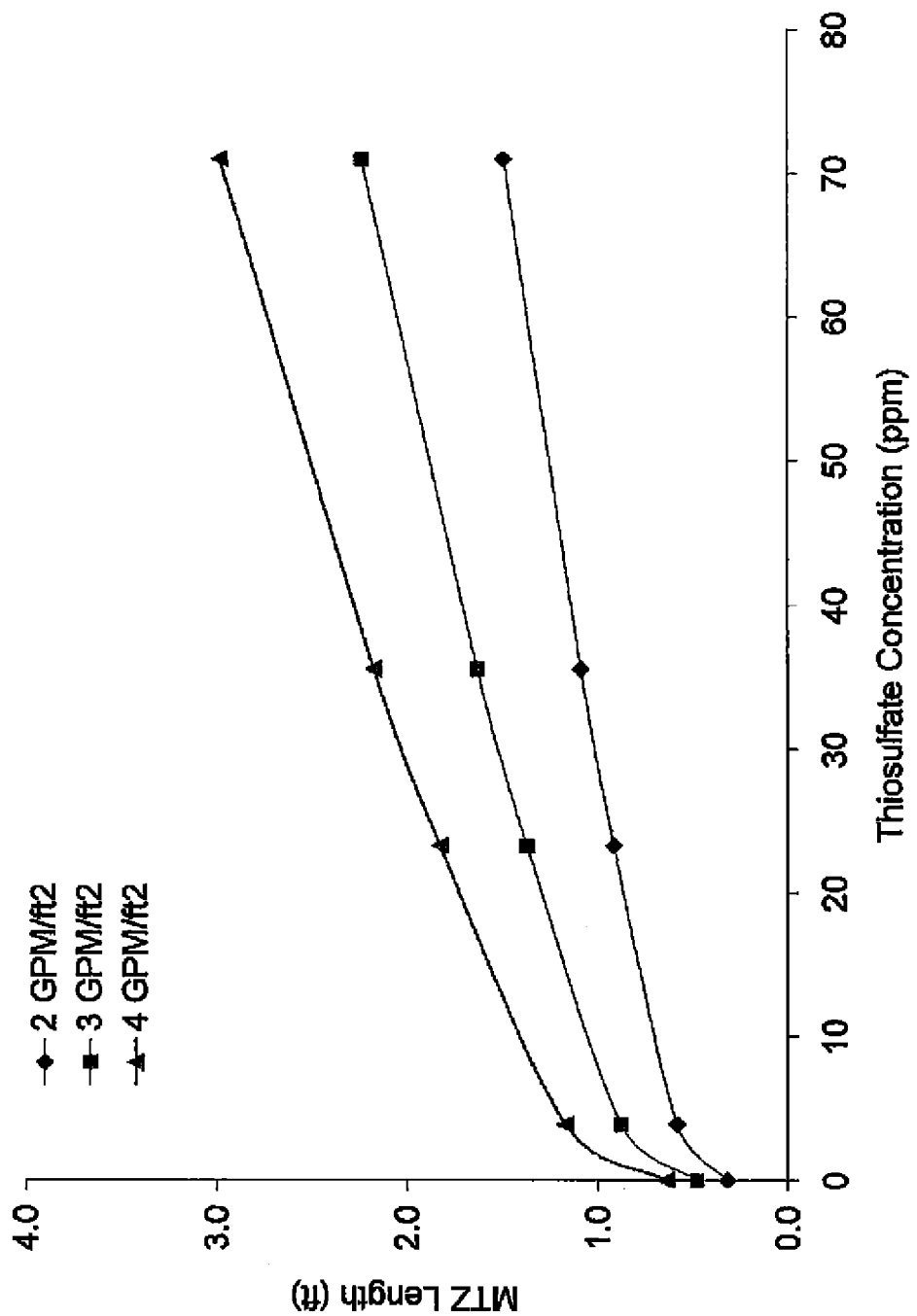
FIG. 11 is a plot showing negative influence of thiosulfate on selenium removal due to additional mass transfer zone (MTZ) length needed as thiosulfate concentration increases.

FIG. 11 shows a plot illustrating negative influence of thiosulfate on selenium removal due to additional mass transfer zone (MTZ) length needed as thiosulfate concentration increases. The MTZ length increases to achieve the selenium removal desired as the thiosulfate concentration increases from 0 to 70 ppm. For example, the MTZ length needed to remove the selenium from the water with 35 ppm thiosulfate doubles relative to the MTZ length needed to remove the selenium from the water without any thiosulfate.

Example 1

With reference to FIG. 4, a petroleum refinery stripped sour water was fed to the first solids filter 400 and the second solids filter 402. The filters 401, 402 sandwiched the pH and temperature adjuster 408 operated to adjust pH of the fluid to 2.75 from 6.0 and increase temperature of the fluid to 82° C. Solids entering the filters 400, 402 providing 20 microns filtration were at a concentration of 500 ppm total suspended solids. Distribution of the particulates was 20 microns to 2000 microns. The pH adjustment between the first solids filter 400 and the second solids filter 402 enabled removing precipitated materials, such as organic compounds that were dissolved above a pH of 2.75, resulting from dropping of the pH. After the solids were removed, the fluid was passed through the granular activated carbon bed 404 to reduce concentration of organic compounds that remained dissolved. The fluid was then passed through two beds of sulfur impregnated activated carbon 506 at a flux of 2 GPM/ft$^2$. Percentage of the selenium removed was above 95% during times of normal operation and for a period of more than 50 days without signs of selenium breakthrough.

Example 2

To illustrate effectiveness of the reducing agent injector 300 and the selenium precipitate remover 302 shown in FIG. 3, water containing selenite at a concentration of 2 ppm was treated by adding thiosulfate as the sodium salt to the water so that a resulting solution was 100 ppm thio sulfate. The solution was adjusted to pH 2.5 using 0.1 molar sulfuric acid and heated to 68° C. The solution was then passed through a bed 100 centimeters long and 1 centimeter diameter of sulfur impregnated activated carbon at a flow rate of 3 GPM/ft$^2$. The effluent selenium concentration from the sorbent beds was 6 ppb to 92 ppb and remained in this concentration range for the treatment of about 55 liters of the solution. The steady state removal efficiency was greater than 95%. Under exact same conditions except with use of virgin activated carbon instead of sulfur impregnated activated carbon, the effluent selenium concentration from the bed was about 15 ppb to 45 ppb and remained in this concentration range for the treatment of about 44 liters of the solution in order to provide a steady state removal efficiency greater than 97.5%. Changing thiosulfate addition to provide the solution with 10 ppm thiosulfate caused the effluent selenium concentration from the bed to be about 328 ppb to 972 ppb and to remain in this concentration range for the treatment of about 40 liters of the solution in order to provide a steady state removal efficiency of about 50%. Further, about 70% of the selenite fell out of a solution as a result of settling prior to the solution even reaching the bed when the solution contained 35 ppm thiosulfate and was otherwise at same conditions. These results demonstrate that removal of the selenite by using the reducing agent injector 300 may rely on simple solid from liquid separation.

The preferred embodiment of the present invention has been disclosed and illustrated. However, the invention is intended to be as broad as defined in the claims below. Those skilled in the art may be able to study the preferred embodiments and identify other ways to practice the invention that are not exactly as described herein. It is the intent of the inventors that variations and equivalents of the invention are within the scope of the claims below and the description, abstract and drawings are not to be used to limit the scope of the invention.

The invention claimed is:

1. A selenium removal system for removing selenium from a fluid, comprising:
   A solids removal unit for processing a fluid;
   An oils removal unit coupled to receive the fluid from the solids removal unit;
   A soluble organics removal unit coupled to receive the fluid from the oils removal unit;
   A thiosulfate removal unit coupled to receive the fluid from the soluble organics removal unit;
   A selenium removal unit coupled to receive the fluid from the thiosulfate removal unit, said selenium removal unit further comprising a sorbent tellurium material; and
   A polish treatment unit coupled to receive the fluid from the selenium removal unit, the polish treatment unit to remove residual constituents that might otherwise prevent recycling of the fluid.

2. The selenium removal system according to claim 1, further comprising:
   a reducing agent injector coupled to receive the aqueous stream from the selenium removal unit 208.

3. The selenium removal system according to claim 1, further comprising:
   a selenium precipitate remover coupled to receive the fluid from the selenium removal unit.

4. The selenium removal system according to claim 1, further comprising:
   a reducing agent injector coupled to receive the fluid from the selenium removal unit; and
   a selenium precipitate remover coupled to receive the fluid from the reducing agent injector.

5. The selenium removal system according to claim 1, further comprising:
   a sorbent selenium material used in the selenium removal unit.

6. The selenium removal system according to claim 1, further comprising:
   a sorbent sulfur material used in the selenium removal unit.

* * * * *